US005732474A

United States Patent [19]
Cannon

[11] Patent Number: 5,732,474
[45] Date of Patent: Mar. 31, 1998

[54] VISUAL AID AND MANIPULATIVE FOR DEMONSTRATING GEOMETRIC AND TRIGONMETRIC FUNCTIONS

[76] Inventor: Peggy Cannon, 3409 Loop Rd., Monroe, La. 71201

[21] Appl. No.: 666,958

[22] Filed: Jun. 20, 1996

[51] Int. Cl.⁶ .................. B43L 7/10; G01B 5/24
[52] U.S. Cl. .............. 33/452; 33/114; 33/456; 33/471; 33/465
[58] Field of Search ............... 33/452, 114, 424, 33/425, 430, 435, 464, 465, 471, 472, 456, 463, 562

[56] References Cited

U.S. PATENT DOCUMENTS

| D. 342,685 | 12/1993 | Stokes | D10/64 |
|---|---|---|---|
| 662,977 | 12/1900 | Schmelz | 33/463 |
| 1,129,081 | 2/1915 | Edmonds | 363/456 |
| 2,460,713 | 2/1949 | Richardson | 33/463 |
| 3,766,652 | 10/1973 | Gomez | 33/472 |
| 4,872,267 | 10/1989 | Anderton | 33/463 |
| 5,020,233 | 6/1991 | Syken | 33/465 |
| 5,113,590 | 5/1992 | Shapiro et al. | 33/471 |
| 5,117,560 | 6/1992 | Nevins | 33/471 |
| 5,412,875 | 5/1995 | Hilderbrandt | 33/464 |

Primary Examiner—Christopher W. Fulton
Attorney, Agent, or Firm—Robert N. Montgomery

[57] ABSTRACT

The present invention herein called "LABEs", comprises a manipulative for assisting students in the visual understanding of the relationships of all angles in a rectangle, triangle, or other such geometric shapes relative to their side lengths, thus allowing the student to prove theorems used in the teaching of geometry. The manipulative further comprises a disk having indicia representing a 360 degree compass, the disk having a first fixed leg, bearing indicia in units of length, extending from the disk at a point adjacent the zero degree indicia mark, and a second leg, having a sleeve portion, which is pivotally attached to the center of the disk by a snap grommet, the sleeve portion being capable of accepting the fixed leg of a second LABE in a longitudinal, adjustable manner therein.

12 Claims, 4 Drawing Sheets

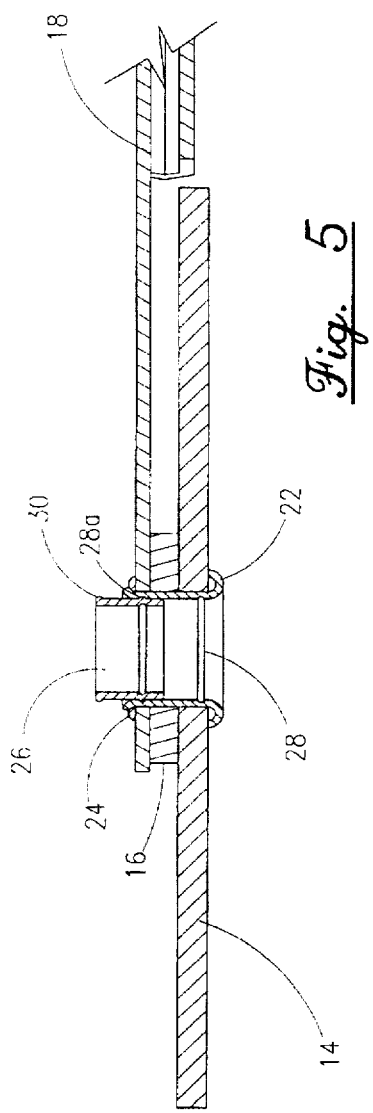
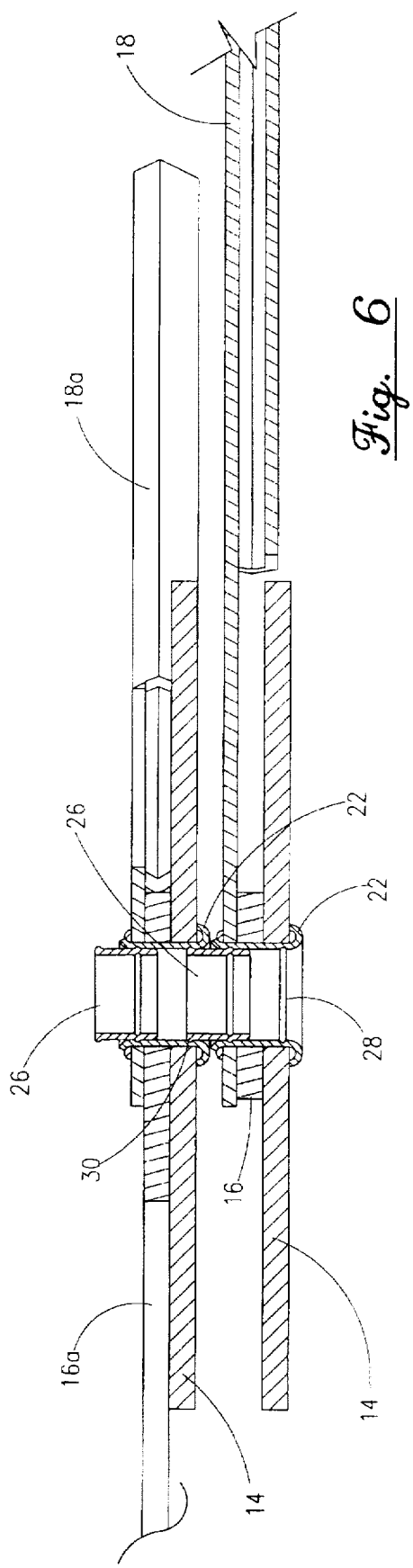

ND MANIPULATIVE FOR
VISUAL AID AND MANIPULATIVE FOR DEMONSTRATING GEOMETRIC AND TRIGONMETRIC FUNCTIONS

BACKGROUND OF THE INVENTION

FIELD OF THE INVENTION

GENERAL BACKGROUND

The present invention relates to a student manipulative in general and those which are useful in demonstrating geometric and trigonometric functions in particular.

Students being introduced to geometric and trigonometric function for the first time begin with a protractor because of its simplicity. Relationships of angles as parts of circles become obvious even to elementary students. However, the relationship of one side of a polygon to another or the relationship between the length of one side of a triangle to any of the angles is often confusing to the student. It is also hard for an instructor to demonstrate these relationships on a chalk board due to the different functions. It is therefore useful to use manipulative whereby each student can see for themselves how each function relates to a specific problem. Manipulative are often used by students which provide a means for calculating the various trigonometric functions such as that disclosed in U.S. Pat. No. 3,826,021. However, such manipulative fail to demonstrate the relationship one angle has on another adjacent angle without additional calculations.

Various aids used in measuring and calculating angles have been disclosed with angle bisectors such as those disclosed in U.S. Pat. Nos. 5,117,560, 5,113,590, 3,766,652, and Des. 342,685. Such devices are primarily used to overlay and measure and assist in the calculation of trigonometric functions but do not demonstrate the relationship one angle has on another adjacent angle or the relationship of the length of a leg on an opposite or adjacent angle.

SUMMARY OF THE PRESENT INVENTION

The present invention provides the student with an elementary visual understanding of the relationships of all angles in a rectangle, triangle, or other such geometric shape relative to its side lengths. The present invention referred to herein as LABEs are theorem tools which improve the teaching of geometry. LABES move abstract concepts and theorems into visual forms. With the student able to manipulate polygons and angles and circles, they immediately begin to see the relationships between sides and angles. Therefore when LABES are used in conjunction with a geometry textbook, students learn theorems which can be visually seen on the LABES thereby testing the concept.

The present manipulative (LABE), comprises both fixed and rotatable legs in association with a protractor. The protractor being a generally flat disc having 360 degree indicia marking on its face and a fixed leg extending from the zero mark and a second leg pivoting from the center of the disc with one leg serving as a sleeve to receive the leg of another LABE. The sleeve or fixed leg may be legended with markings indicating its length relative to the center of a second LABE with its leg slidably inserted in the first LABE's sleeved leg. The arrangement provides a visual aid which allows two or more of the manipulative to be attached to each other. Such an arrangement allows the manipulative to be formed in a manner whereby students can discover for themselves the relationships involving triangles of all types, and base angles involving quadrilaterals, parallelograms and polygons. The manipulative further provides hands-on understanding of circle relationships for central angles, arcs, tangents and inscribed angles. Stacking of the manipulative by inserting one LABE'S grommet into that of another, further allows the manipulative to produce compound, three dimensional, angle relationships as well. Such an arrangement allows the manipulative to be formed in a manner whereby students can discover for themselves the relationships between supplementary, complementary, vertical and adjacent angles as well as linear pairs.

BRIEF DESCRIPTION OF TEE DRAWINGS

For a further understanding of the nature and objects of the present invention, reference should be made to the following detailed descriptions, taken in conjunction with the accompanying drawings, in which like parts are given like reference numerals, and wherein:

FIG. 5 is a cross-section elevation view taken along sight line 5—5 seen in FIG. 1;

FIG. 6 is a cross-section elevation view taken along sight line 6—6 seen in FIG. 2;

Figure 3:
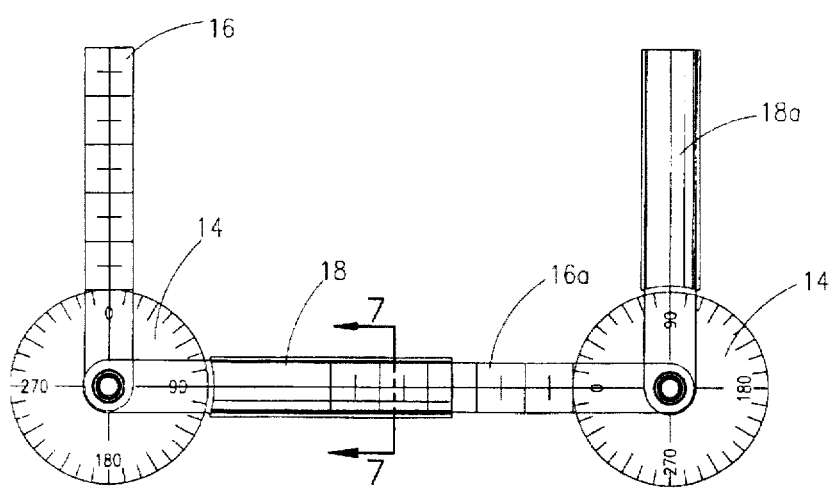
FIG. 3 is a top view of a pair of LABEs insertably connected one to another.
Figure 7:
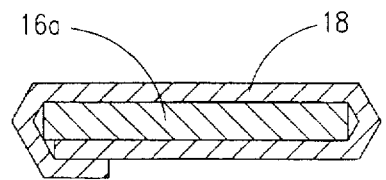

FIG. 7 as a cross-section elevation view taken along sight line 7—7 seen in FIG. 3.

Figure 8:
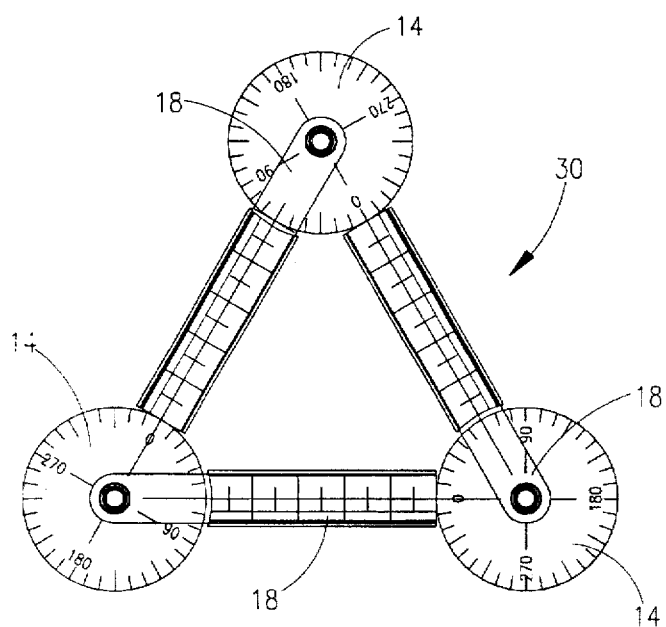
Figure 9:
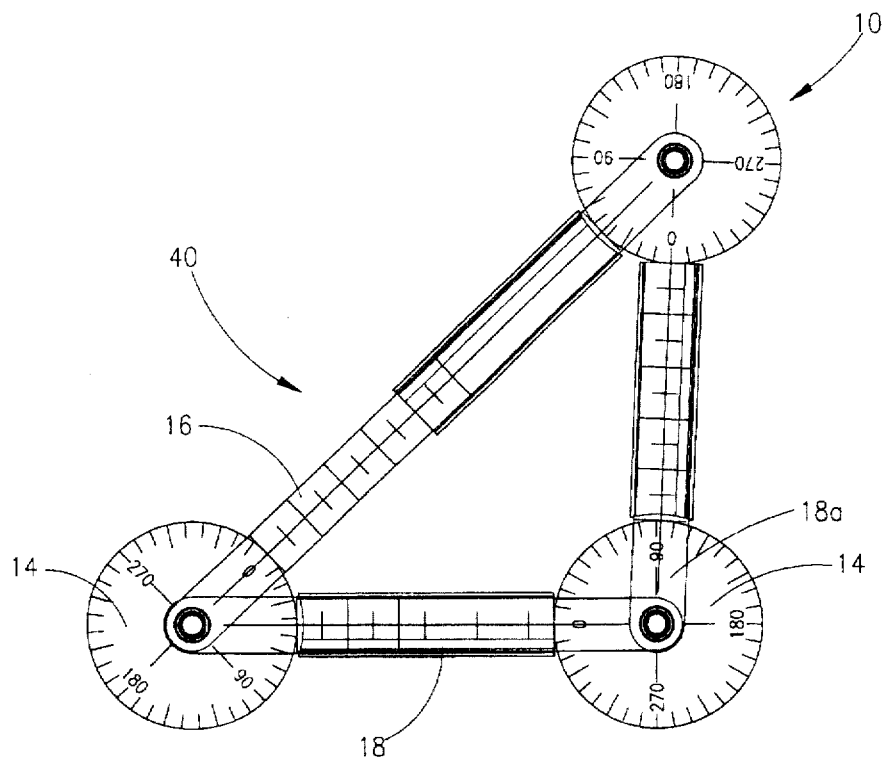
Figure 10:
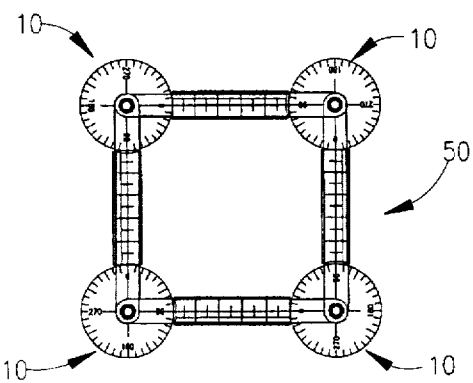
Figure 11:
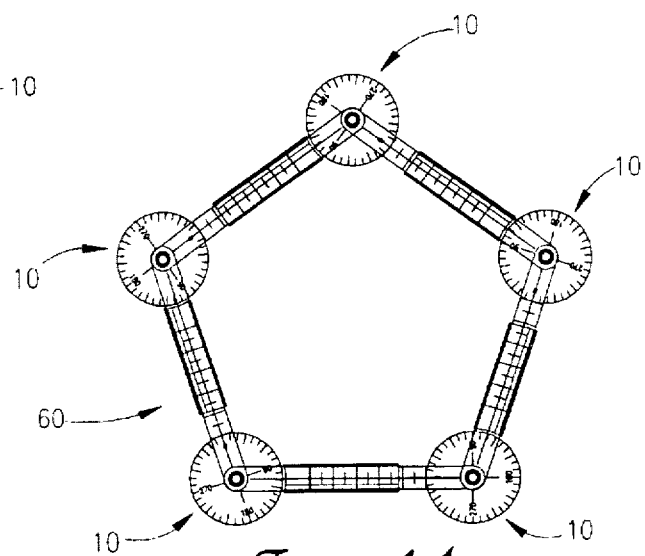
Figure 12:
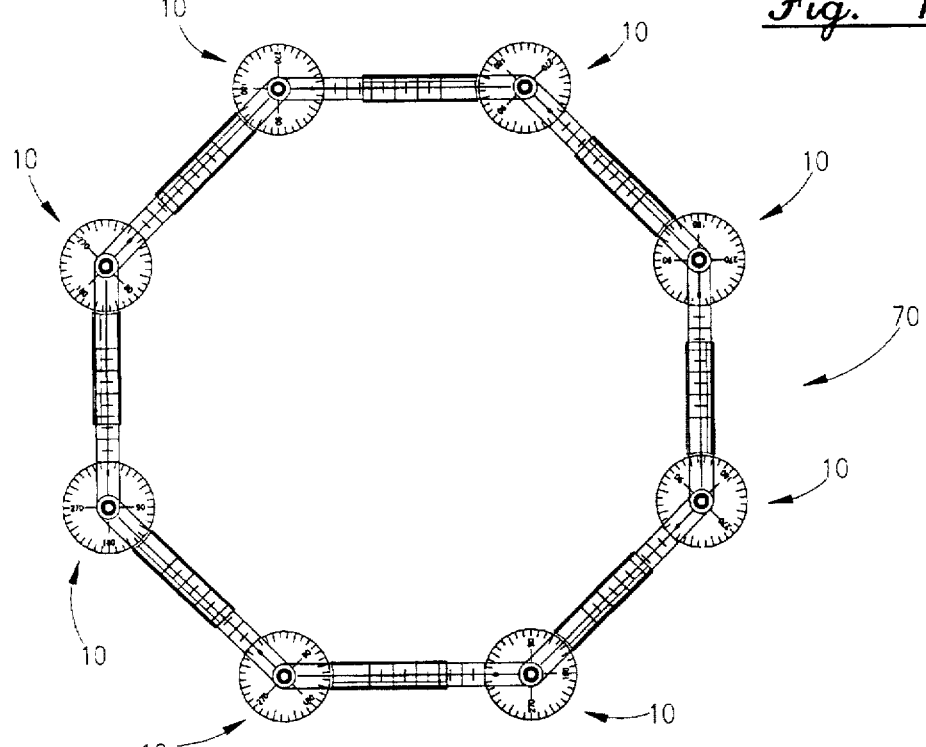

FIG. 8 as a top view of three LABES inserted one in another forming an equilateral triangle;

FIG. 9 is a top view of three LABES inserted one in another forming a right triangle;

FIG. 10 is a top view of four LABES inserted one in another forming a square;

FIG. 11 is a top view of five LABES inserted one in another forming a pentagon; and FIG. 12 is a top view of eight LABES inserted one in another forming an octagon.

DESCRIPTION OF THE PREFERRED EMBODIMENT

Figure 1:
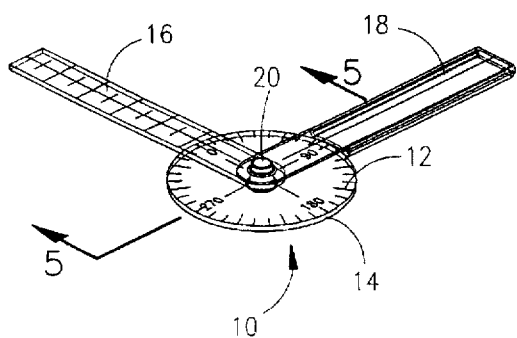
FIG. 1 is an isometric view of the inventive entity or LABE.
Figure 2:
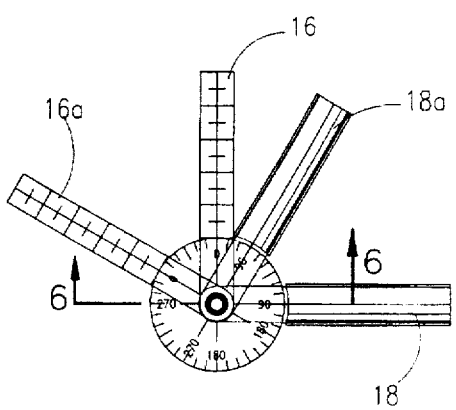
FIG. 2 is a top view of two LABES snapped together one over the other.
Figure 4:
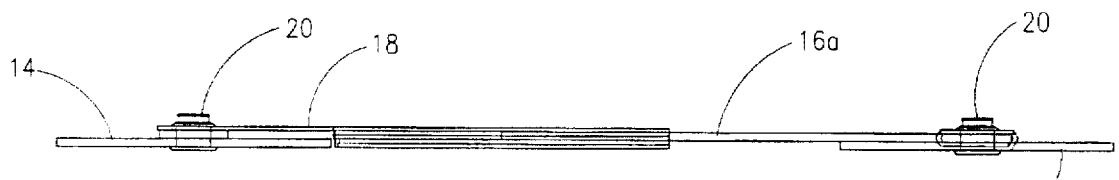
FIG. 4 is a cross-section elevation view taken along sight line 4—4 seen in FIG. 3.

The present invention as seen in FIG. 1 herein after called "LABEs" 10, comprises a manipulative having indicia 12 representing a 360 degree compass inscribed on the face of a generally flat, circular disk 14, the disk 14 having a fixed leg 16, extending from the disk at a point adjacent the zero degree indicia mark on the disk 14. The fixed leg 16 also has indicia inscribed on its surface indicating units of length, which may be in inches or metric units. A second leg 18 is pivotally attached to the center of the disk 14 by a snap grommet 20. A portion of the second leg 18 is a sleeve configured as shown in FIG. 4 for accepting the first fixed leg 16a of a second LABE 10 in a longitudinal, adjustable manner therein. A non-sleeved portion of the pivotal leg 18 is pivotal about the grommet 20 in a manner whereby the sleeve portion is approximately equal to the height of the base 14 and the fixed leg 16. The pivotal second leg 18 is transparent or slotted in a manner whereby the indicia on the disk 14 may be seen directly under the leg 18. When the fixed leg 16a is inserted into the pivotal leg 18 as seen in FIG. 3 one leg 16 is free to accept another LABE as is free pivotal leg 18a. The snap grommet 20 seen in cross section in FIG. 5 is comprised of a sleeve portion 22, a washer portion 24, and a snap portion 26. The sleeve portion 22 has upper and lower grooves 28, 28a for accepting the snap portion 26 having a corresponding projection for mating with the upper grove 28a in the sleeve portion 22 and a ridge 30 for mating with the lower groove 28 in the sleeve portion of a second LABE as shown in cross section FIG. 6. The snap grommet 20 being capable of receiving the snap portion 26 of the grommet 20 from a second LABE 10 allows the LABE to be stacked one upon the other and operated as an overlay having multiple legs as best seen in FIG. 2. Intersecting segments can then be formed to discover supplementary, complementary, vertical and adjacent angles, and linear pairs.

Arrangement of the LABEs by slidably inserting the fixed leg 16a of one LABE 10 into the sleeved, pivotal leg 18 of a second LABE, allows interaction of multiple angles relative to the length of the leg, common to the two LABES. By connecting three or more LABEs in the manner shown in FIG. 8, various geometric shapes may be formed, such as, triangles, quadrilaterals, and other polygons. The use of three LABEs connected in the above manner, forming a triangle 30, allows a student to change measurements of any or all three legs easily thus forming right 40 or obtuse angles, thereby, easily assimilating the changes in the angles. The length of each leg is also easily defined when the angles are manipulated. It becomes much easier to understand the various types of triangular relationships when all effects are visually seen at once.

A fourth LABE may be used as seen in FIG. 10 in association with triangles 30, 40 formed by three LABEs shown in FIG. 9 for forming squares 50 rectangles and parallelograms. A LABE may also be snapped into the vertex of any angle as shown in FIG. 2 for determining non-inclusive exterior angle corollary, and forming medians, altitudes, and angle bisectors.

Four LABEs may also be used to form quadrilaterals 50 by using the leg-to-sleeve formation as seen in FIG. 10, thus producing parallelograms and trapezoids which prove their properties and theorems. Concepts and theorems of diagonals may also be developed by snapping a fifth LABE as seen in FIG. 11 into the quadrilateral 50 thus forming pentagons.

A set of two or more LABEs may also be joined at the grommets 20 to form overlapping triangles with reflexive sides. Six LABES may be used to form two triangles for congruent and similar triangles. Eight or more LABES may be joined to form octagons 70 as seen in FIG. 12 which further define the use of central angles, arcs, tangents and inscribed angles in circles.

Because many varying and different embodiments may be made within the scope of the inventive concept herein taught and because many modifications may be made in the embodiments herein detailed in accordance with the descriptive requirement of the law, it is to be understood that the details herein are to be interpreted as illustrative and not intended to limit the invention.

What is claimed is:

1. A teaching aid, manipulative useful in the visual instruction of geometry and trigonometry comprising:
    a) a disk, having 0–360 degree markings thereon;
    b) a fixed leg, attached to said disk;
    c) a rotatable leg, having a sleeve portion, pivotally attached to said disk; and
    d) a grommet means having a sleeve and snap portion for pivotally attaching said rotatable leg to said disk and attachment of a second identical teaching aid.

2. The teaching aid manipulative as described in claim 1 wherein said fixed leg has indicia markings indicative of units of length.

3. The teaching aid manipulative as described in claim 1 wherein said rotatable leg, sleeve portion is capable of slidably receiving said fixed leg of a second identical manipulative.

4. The teaching aid manipulative as described in claim 3 wherein said rotatable leg is pivotal about the vertical central axis of said disk.

5. The teaching aid manipulative as described in claim 1 wherein at least a portion of said fixed and pivotal legs are transparent, to allow said markings on said disk to be viewed through said rotatable leg.

6. The teaching aid manipulative as described in claim 1 wherein said snap grommet has a receiving and connecting means for being snapped into a snap grommet of a second manipulative having a grommet having receiving and connecting means.

7. The teaching aid manipulative as described in claim 1 wherein said snap grommet comprises:
    a) a sleeve portion having a head portion and upper and lower internal grooves;
    b) a washer portion in sliding contact with outside diameter of said sleeve portion;
    c) a snap portion comprising a tubular body, having a bead along its length, and culminating in a head having an external bead.

8. A method of teaching Geometry and Trigonometry with the use of visual manipulative comprising the steps of:
    a) manipulating a 1st manipulative comprising a disk having indicia representing the degrees of a circle, one fixed leg having indicia representing units of length and one pivotal leg having a sleeved portion, centrally attached to said disk by a snap grommet, in a manner whereby the relationship of said legs to each other, relative to a 360 degree circle, may be observed;
    b) connecting a plurality of such manipulative by inserting said fixed leg of a second manipulative into said sleeved portion of said 1st manipulative's pivotal leg, and a third manipulative in said second manipulative etc., thereby forming triangles, squares and other geometric shapes; and
    c) attaching one manipulative above another by snapping said snap grommet of one manipulative into that of another at the vertex of any angle, for determining non-inclusive, exterior angle corollary, and thereby forming medians, altitudes, and angle bisectors.

9. A method according to claim 8 wherein said grommet serves as both a pivot for said pivotal leg and a snap for connecting one manipulative one above the other.

10. A method according to claim 9 wherein installation of said grommet comprised of a sleeve portion, a washer portion and a snap portion comprises the steps of:
    inserting said sleeve portion along the central axis of said disk, the ends of said fixed and pivotal legs and said washer;
    flaring said sleeve in place, thus retaining said washer and pivotal leg relative to said disk and said fixed leg; and
    inserting said snap portion into said sleeve portion.

11. A geometry teaching, manipulative according to claim 10 wherein said snap grommet of one manipulative may be attached to that of another, one above the other, with a snap grommet comprising:
    a) a grommet inserted along the vertical axes of said disk in a first manipulative, passing through said disk, said fixed leg and said pivotal leg, said grommet further comprising:

a sleeve portion having a head portion and upper and lower internal grooves;

a washer portion in sliding contact with outside diameter of said sleeve portion; and a snap portion comprising a tubular body, having a bead along its length, and culminating in a head having an external bead; and b) an identical grommet in a second manipulative capable of receiving said head portion into said lower portion of said sleeve portion of said second manipulative, grommet for snap-in correlation with said sleeve's lower groove.

12. A geometry teaching, manipulative comprising:

a) a 1st manipulative comprising:

a disk, having 0–360 degree markings thereon;

a first fixed leg having indicia representing units of length, attached to said disk at said zero degree mark;

a second leg a portion of which is translucent and having a sleeve portion, pivotally attached to said disk; and a grommet means having a sleeve and snap portion for pivotally attaching said second leg to said disk and attachment of a second identical teaching aid; and b) a second manipulative identical to said first manipulative, having its fixed leg slidably inserted into said first manipulative, pivotal leg, sleeve portion; and c) a third manipulative identical to said first and second manipulative, having its fixed leg slidably inserted into said second manipulative, pivotal leg, sleeve portion and its pivotal leg, sleeve portion slidably receiving said first manipulative fixed leg, in a manner whereby a triangle is formed.

* * * * *